(12) United States Patent
Kang

(10) Patent No.: US 8,749,228 B2
(45) Date of Patent: Jun. 10, 2014

(54) TORQUE INDEX SENSOR

(75) Inventor: Minchul Kang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 168 days.

(21) Appl. No.: 13/230,206

(22) Filed: Sep. 12, 2011

(65) Prior Publication Data

US 2012/0062216 A1 Mar. 15, 2012

(30) Foreign Application Priority Data

Sep. 13, 2010 (KR) .......................... 10-2010-0089367

(51) Int. Cl.
*G01R 33/07* (2006.01)
*G01B 7/30* (2006.01)

(52) U.S. Cl.
USPC ....................... 324/207.25; 324/207.2; 701/41

(58) Field of Classification Search
None
See application file for complete search history.

(56) References Cited

U.S. PATENT DOCUMENTS

| | | | | |
|---|---|---|---|---|
| 5,523,679 A | * | 6/1996 | Kalb | 324/165 |
| 2004/0141669 A1 | * | 7/2004 | Landrieve et al. | 384/448 |
| 2011/0167920 A1 | * | 7/2011 | Rink et al. | 73/760 |

FOREIGN PATENT DOCUMENTS

DE 102005038516 A1 * 2/2007

OTHER PUBLICATIONS

Machine English translation of German Patent Application Publication to Applicants Froehlich E and Thom J. DE 102005038516 A1, Feb. 8, 2007. Translation of Description, pp. 2-10 created on May 16, 2013.*

* cited by examiner

*Primary Examiner* — Melissa Koval
*Assistant Examiner* — Stephen G Armstrong
(74) *Attorney, Agent, or Firm* — Saliwanchik, Lloyd & Eisenschenk

(57) ABSTRACT

A torque index sensor is configured to enhance productivity with excellent economic feasibility by simplifying a magnet structure of an index sensor unit. The torque index sensor is connected to an input shaft and an output shaft, and the torque index sensor includes a housing; an index magnet housed in the housing, connected to the output shaft to rotate with the output shaft and formed in the shape of a rectangle at a cross-sectional view; and a magnetic device secured to an interior of the housing to output a magnetization signal in response to rotation of the index magnet, such that the shape of the index magnet is simplified to a rectangle to enhance productivity and economic feasibility.

5 Claims, 5 Drawing Sheets

TORQUE INDEX SENSOR

CROSS-REFERENCE TO RELATED APPLICATION

This application claims the benefit under 35 U.S.C. §119 of Korean Application No. 10-2010-0089367, filed Sep. 13, 2010, which is hereby incorporated by reference in its entirety.

BACKGROUND OF THE DISCLOSURE

1. Field of the Disclosure

The present disclosure relates to a torque index sensor, and more particularly to a torque index sensor configured to enhance productivity with excellent economic feasibility by simplifying a magnet structure of an index sensor unit.

2. Discussion of the Related Art

In a conventional vehicle, a steering wheel connected to wheels is operated to manipulate a traveling direction. However, an operating force may decrease to make it difficult to quickly operate the vehicle, in case there is a large resistance between wheels and road surface, or there is generated an obstacle to steering operation. In order to solve the problem, a power steering system is proposed. The power steering system serves to provide a power transfer device to operation of the steering wheels, thereby reducing operating force.

In order for the power steering system to provide a force of operating the steering wheels, needs arise to measure a torque applied to a steering axis, a steering angle and an angular velocity. Apparatus of various methods are proposed for measuring torques of steering wheel. Particularly, a method for detecting a torque is largely employed for economic reasons in which a magnetic field of a magnet coupled to a steering axis is measured to detect the torque. Furthermore, a method for detecting an electromagnetic rotation is widely used to detect the steering angle and the angular velocity by employing a gear rotating along with a steering wheel and a driven gear meshed with the gear.

However, the device or system detecting the steering angle or the angular velocity suffers from disadvantages such as complicated fabrication processes, and a high probability of error occurrences from malfunction or erroneous operation, such that a method using an index sensor is employed.

A steering structure generally includes an input shaft coupled to a steering wheel, an output shaft coupled to a pinion meshed to a rack bar of wheel side, and a torsion bar connecting the input shaft to the output shaft.

In case a steering wheel is rotated, a rotational force is transmitted to the output shaft to change wheel directions responsive to operation of pinion and rack bar. In this case, if resistance is great, the input shaft is turned more to twist the torsion bar, where a twist level of torsion bar is measured by a torque sensor of magnetic field method.

An index sensor is provided for measuring angular velocity and angular acceleration by detecting rotation of a magnet rotating with the output shaft. The torque sensor and the index sensor may be modularized, and a modularized device is called a torque index sensor (TIS). That is, a torque index sensor (TIS) is an integrated device of a torque sensor for detection of steering torque in steering manipulation and an index sensor for detection of number of turns of a steering shaft, wherein these sensors are installed in a steering system of an automobile for example.

The TIS is advantageous due to structural simplicity and economic reasons, but concurrently disadvantageous due to inevitable occurrence of magnetic field interference caused by a structure in which two types of magnetization detection device are adjacently arranged. In order to solve the disadvantage, the torque sensor and the index sensor are needed to maintain a predetermined distance, such that a distance of 35 mm is generally secured to avoid occurrence of magnetic field interference.

As a result, there is generated a disadvantage of unnecessarily increasing a size of the TIS and of considering a magnetic field interference for fabricating the TIS into a compact size.

FIG. 1 is a perspective view illustrating a torque index sensor according to prior art and FIG. 2 is a perspective view illustrating essential parts of a torque sensor unit and an index unit of the torque index sensor of FIG. 1.

Referring to FIGS. 1 and 2, an input shaft that is inserted into TIS (Torque Index Sensor) from an upper side is coupled to a rotor (12) coupled to a magnet, where the rotor (12) takes the shape of a ring. An output shaft is coupled by a stator (11), where the stator (11) is discretely arranged from a periphery of the rotor (12) and includes an axially-bent vertical lug piece (13).

In a case a twist is generated to a torsion bar by a rotational difference between the input shaft coupled to the rotor (12) and the output shaft coupled to the stator (11), the rotor (12) and the stator (11) are relatively rotated, where a facing surface between the periphery of the rotor (12) and the axially-bent vertical lug piece (13) is changed to change a magnetization value, and where the changed magnetization value may be utilized to measure a torque.

A collector (14) is arranged to concentrate the magnetization value, and a torque sensor magnetic device (15) detects the magnetization value concentrated by the collector (14).

Meanwhile, an index unit is arranged at a bottom side of the torque sensor unit. The index unit includes an index magnet (31) and an index magnet device (35), where the index magnet (31) is connected to the output shaft along with the stator (11) and rotated therewith.

Although the torque sensor unit and the index unit are modularized inside a housing (22) and form an integrated configuration, each of the torque sensor unit and the index unit functions differently. That is, the torque sensor unit measures a torque change in response to change in magnetization value and sends a detection signal to a PCB (Printed Circuit Board, 21), while the index unit sends a detection signal of an amount of magnetization that is changed by the index magnet device in response to rotation of the index magnet (31).

FIG. 3 includes a cross-sectional view of an essential part of an index unit in a torque index sensor and an enlarged view of an index magnet according to prior art.

Referring to FIG. 3, an index magnet (40) is so configured as to be coupled to a periphery of an index housing (32) or to form a part of the periphery of the index housing (32). The index magnet may also approach or distance itself from an index magnetic element (35) secured to the housing (22) to generate an impulse signal.

The index magnet (40) basically includes three individual magnets for generating an impulse signal. FIG. 3 shows an enlarged view of the index magnet (40). The index magnet (40) magnetizes the index housing (32) and takes a shape of an arc to maintain magnetization amount of the index magnet device (35) at a constant level.

Meanwhile, in order to form the index magnet (40), each magnet is made to take the shape of an arc, and coupled to a contact surface (41). However, there exists a problem of naturally increasing a manufacturing cost and decreasing operational efficiency in the course of manufacturing and processing the index magnets (40). The problem results in a decreased advantage of the torque index sensor for reducing the manufacturing cost and simplifying the structure.

BRIEF SUMMARY

The present disclosure is directed to cope with the above-mentioned problems and disadvantages and it is an object of the present disclosure to provide a torque index sensor configured to enhance productivity and increase economic feasibility by simplifying an index magnet structure of a torque index sensor.

Technical problems to be solved by the present disclosure are not restricted to the above-mentioned description, and any other technical problems not mentioned so far will be clearly appreciated from the following description by the skilled in the art.

In one general aspect of the present disclosure, there is provided a torque index sensor of a steering system connected to an input shaft and an output shaft, the torque index sensor comprising: a housing; an index magnet housed in the housing, connected to the output shaft to rotate with the output shaft and formed in the shape of a rectangle at a cross-sectional view; and a magnetic device secured to an interior of the housing to output a magnetization signal in response to rotation of the index magnet, whereby the shape of the index magnet is simplified to a rectangle to enhance productivity and economic feasibility.

Preferably, the torque index sensor is interposed between the output shaft and the input shaft, and takes the shape of a ring, wherein the index magnet further includes an index housing that is coupled to a part of the periphery, whereby the index magnet shaped of a rectangle can be stably magnetized.

Preferably, the index magnet is such that a plurality of magnets is arranged, each contacting the other magnet, wherein each of the plurality of magnets has a polarity opposite to that of an adjacent magnet, and takes the shape of a rectangle, whereby each of the magnets can be easily coupled to enhance the productivity.

Preferably, three index magnets are arranged lengthwise, each magnet contacting the other magnet, and a contact surface of each magnet is in parallel with that of the other magnet, whereby coupling and magnetization of magnets can be easily realized.

Preferably, the magnetic device generates an impulse signal in response to rotation of the index magnet, whereby structure can be simplified to enhance an angular sensing efficiency.

Preferably, the magnetic device is a Hall element or a Hall IC.

As apparent from the foregoing, the torque index sensor according to exemplary embodiment of the present disclosure is advantageous in that the index magnet is simply shaped of a rectangle to enhance productivity and economic feasibility, and mutual coupling and arrangement, whereby an angular sensing efficiency can be enhanced.

DETAILED DESCRIPTION

Figure 1:
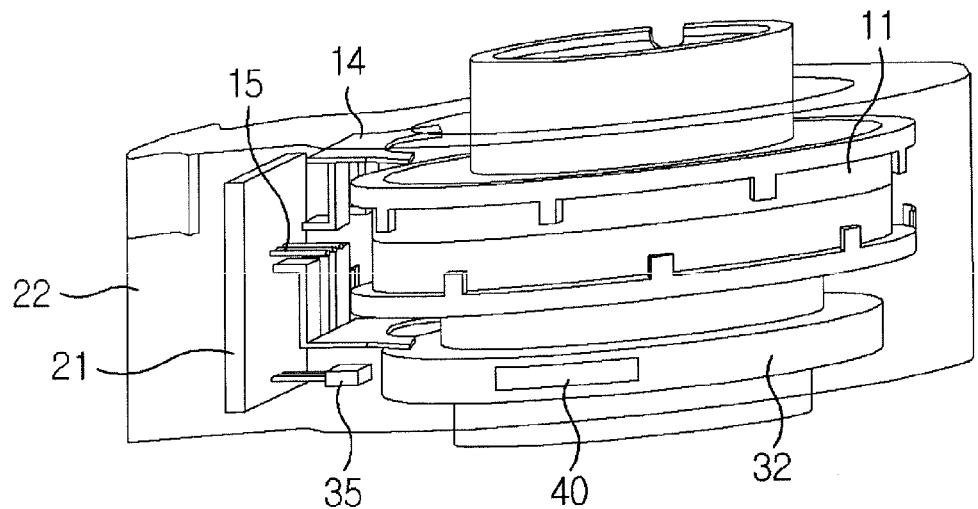
FIG. 1 is a perspective view illustrating a torque index sensor according to prior art.
Figure 2:
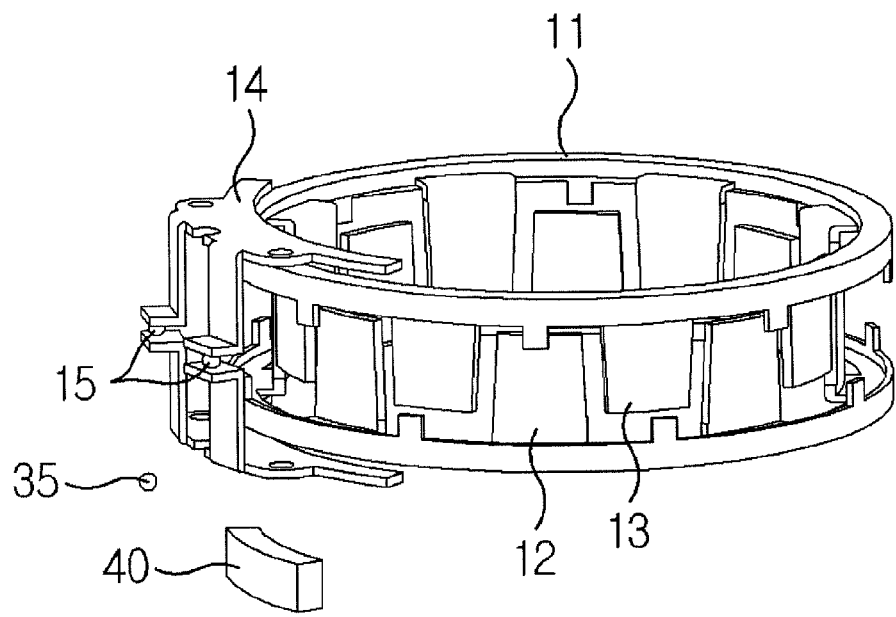
FIG. 2 is a perspective view illustrating essential parts of a torque sensor unit and an index unit of the torque index sensor of FIG. 1.
Figure 3:
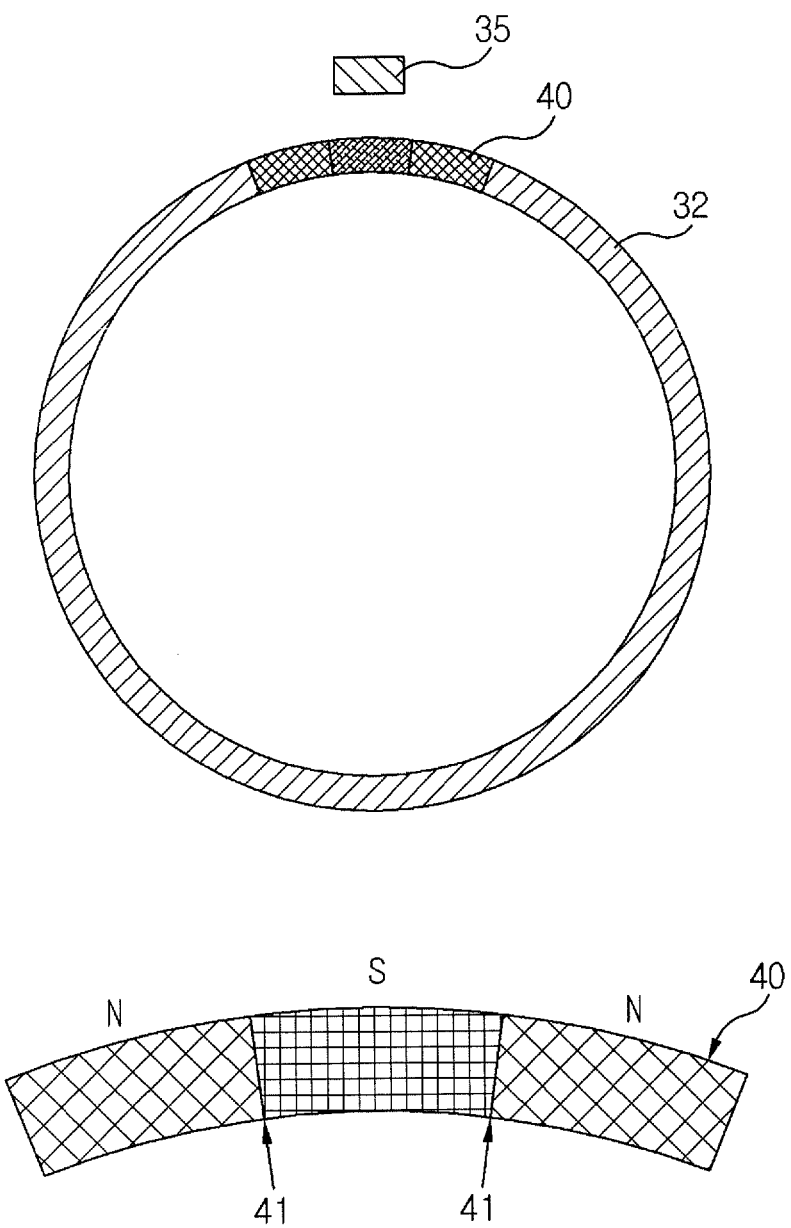
FIG. 3 is a cross-sectional view of an essential part of an index unit in a torque index sensor and an enlarged view of an index magnet according to prior art.

Advantages and features of the present invention may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms.

In the drawings, the width, length, thickness, etc. of components may be exaggerated or reduced for the sake of convenience. Furthermore, throughout the descriptions, the same reference numerals will be assigned to the same elements in the explanations of the figures, and explanations that duplicate one another will be omitted.

Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification. The terms "a" and "an" herein do not denote a limitation of quantity, but rather denote the presence of at least one of the referenced item.

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. As may be used herein, the terms "substantially" and "approximately" provide an industry-accepted tolerance for its corresponding term and/or relativity between items.

Now, a torque index sensor (hereinafter referred to as "TIS") according to the exemplary embodiments of the present disclosure will be described in detail with reference to the accompanying drawings.

As described in the prior art, the TIS according to the present disclosure includes a torque sensor unit and an index unit that are modularized and coupled in a housing that forms an external appearance of the TIS. The torque sensor unit is such that a rotor is connected to an input shaft, and a stator is connected to an output shaft to measure a rotation amount of the input shaft and the output shaft, where the torque sensor unit is relatively rotated in response to resistance of wheels, and a changed magnetization value is utilized to measure a torque.

That is, it should be appreciated that torsion is generated, in a case the rotation amount between the input shaft and the output shaft is different due to resistance of wheels, where the difference is measured as a magnetic field. However, it should be apparent that the rotor is connected to the output shaft, and the stator is connected to the input shaft.

Meanwhile, the index unit is arranged adjacent to the torque sensor unit, where the index unit of the torque index sensor according to the exemplary embodiment of the present disclosure will be described in detail with reference to FIG. 4.

Figure 4:
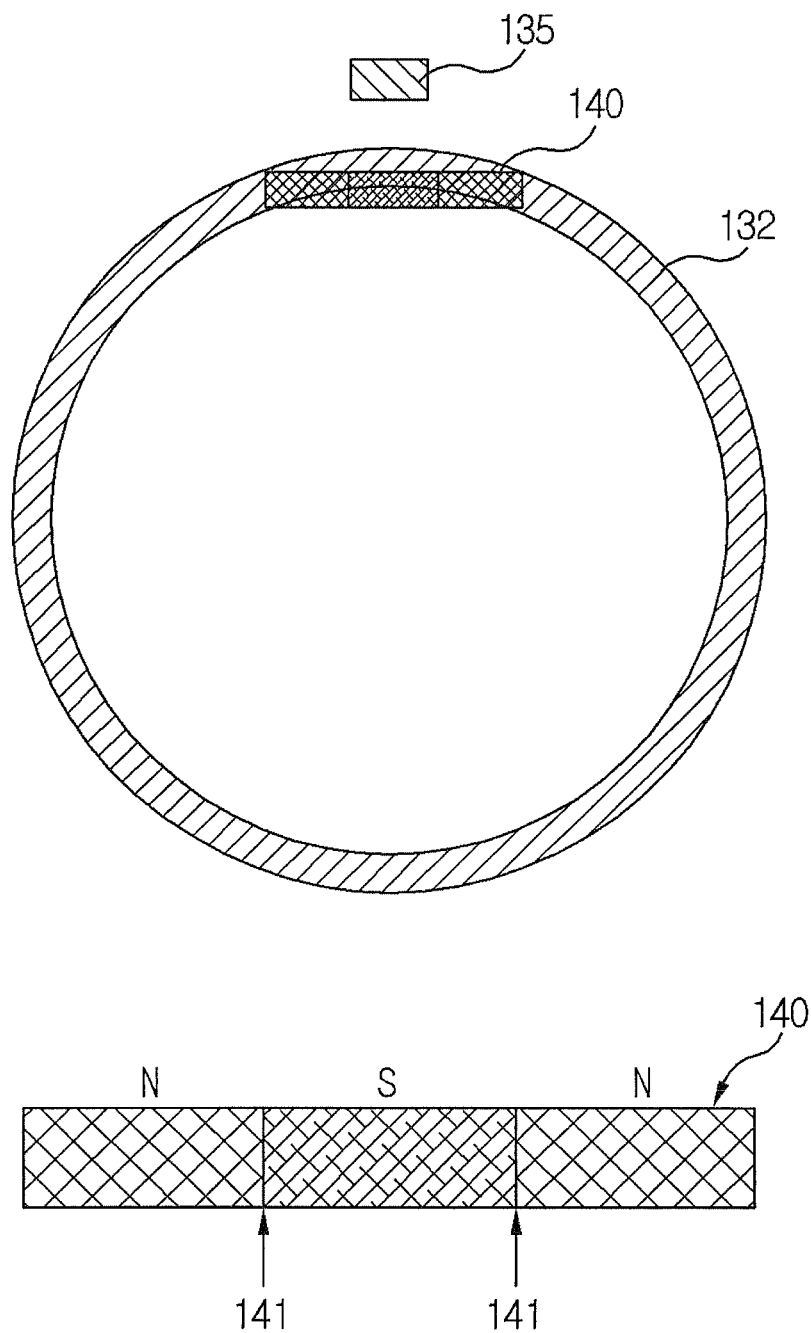
FIG. 4 is a cross-sectional view of an essential part of an index unit in a torque index sensor according to an exemplary embodiment of the present disclosure.

FIG. 4 is a cross-sectional view of an essential part of an index unit in a torque index sensor according to an exemplary embodiment of the present disclosure, where an upper figure illustrates essential parts of the index unit while a bottom figure illustrates an enlarged index magnet.

The torque sensor unit is arranged thereunder with an index unit, and includes an index magnet (140) and an index magnet device (135). The index magnet (140) is generally connected to an output shaft to rotate therewith. The index magnet (140) is made to have only a predetermined length to a circumferential direction unlike a shape of the magnet of the rotor.

The index magnet device (135) is secured to the torque index sensor, relatively away from the index magnet (140), such that the index magnet device (135) can detect a magnetization change in response to rotation of the index magnet (140) to output an impulse signal. The index magnet device is preferably a Hall element or a Hall IC. The index magnet (140) takes the shape of a rectangle according to concept of the present disclosure.

Unlike the prior art in which the index magnet takes a shape of an arc along a circumference of an output shaft to thereby encompass a part of the circumference, the index magnet (140) according to the present disclosure is formed in parallel with a tangent direction of a point of the output shaft. That is, the index magnet (140), if the tangent direction is defined as a lengthwise direction, takes the shape of a rectangle with a long length but with a thin width, when viewed from a cross-section.

Meanwhile, although the index magnet (140) may be so arranged as to rotate with the output shaft by being directly coupled to the output shaft, the index magnet (140) may be arranged to be coupled to one side of the index housing (132) encompassing the circumferential surface of the output shaft, as shown in an upper section of FIG. 4.

The index housing (132) takes the shape of a ring to encompass a circumference of the output shaft, and a part of the index housing (132) is coupled to the index magnet (140). The index magnet (140) may be coupled to the circumference of the index housing (132), or coupled to one side of an upper end or a bottom end of the index housing (132). Furthermore, it should be apparent that the index housing (132) is made to form a groove at one side, and the index magnet (140) may be embedded into the groove.

Therefore, a coupling relationship between the index magnet (140) and the index housing (132) may be variably selected within a scope not affecting the measurement of magnetization change value of the index magnet device (135).

Meanwhile, a bottom figure of FIG. 4 illustrates an enlarged index magnet (140) according to the present disclosure, where arrangement of each magnet is shown.

Although FIG. 4 illustrates three magnets, it should be apparent that more than three magnets may be arranged according to selection. A center in the FIG. 4 is arranged with an S pole, and a magnet lengthwise contacted by both sides is magnetized with an N pole. Based on the concept of the present disclosure, the arrangement of the magnets takes the shape of a rectangle, such that each magnet is preferably shaped of a rectangle or a square. However, it should be also apparent that the arrangement of N pole and S pole may be mutually changeable. Thus, a magnet contact surface (141) between magnets is arranged in parallel. That is, the contact surface (141) and both distal ends of index magnet (140) are formed to a direction perpendicular to a tangent line contacting the periphery of the index housing (132).

The prior art was disadvantageous in that a magnet contact surface was shaped of an arc to increase a manufacturing cost of each magnet and to complicate the coupling process, whereas the present disclosure is advantageous in that each magnet and index magnet (140) are all shaped of a rectangle to solve the disadvantages of the prior art.

The index magnet device (135) of the index unit thus configured repeats the process of distancing from and approaching the index magnet (140) in response to rotation of the output shaft, and changes in magnetization amount are generated by the process.

The index magnet device (135) detects the changes in magnetization amount and outputs a detection signal to analyze an angular velocity and an angular acceleration using algorithm. That is, the index unit outputs an impulse signal at every 360 degree.

Meanwhile, FIG. 5 is a schematic view of a torque index sensor according to prior art, and a schematic view visually illustrating a magnetization amount of a torque index sensor according to an exemplary embodiment of the present disclosure.

Figure 5A:
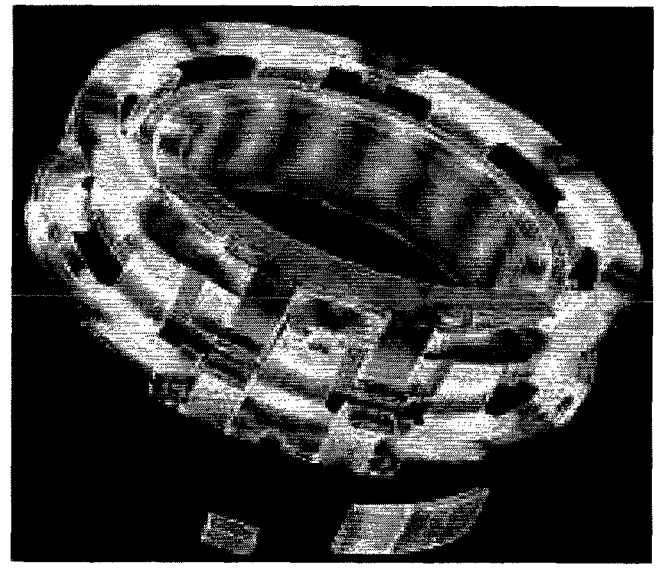
FIG. 5A is a schematic view of a torque index sensor according to prior art.
Figure 5B:
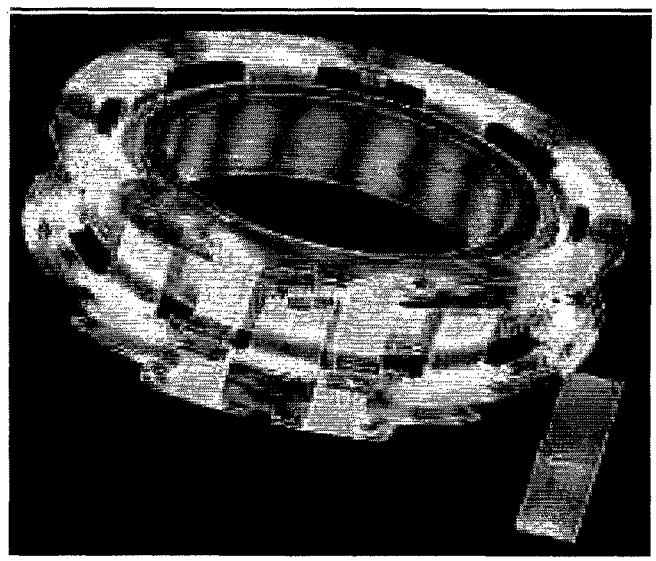
FIG. 5B is a schematic view visually illustrating a magnetization amount of a torque index sensor according to an exemplary embodiment of the present disclosure.

FIG. 5A shows a magnetization amount of a torque index sensor arranged with a circular index magnet according to prior art, and FIG. 5B illustrates a magnetization amount of a torque index sensor arranged with a rectangular index magnet. Bright areas are where magnetization amount is large, while dark areas are where magnetization amount is small.

As illustrated from the figures, it should be noted that there is no big visual difference in magnetization amount. That is, even if an index magnet with a simple structure is applied, there is no decrease in torque and angle detection performances.

Figure 6:
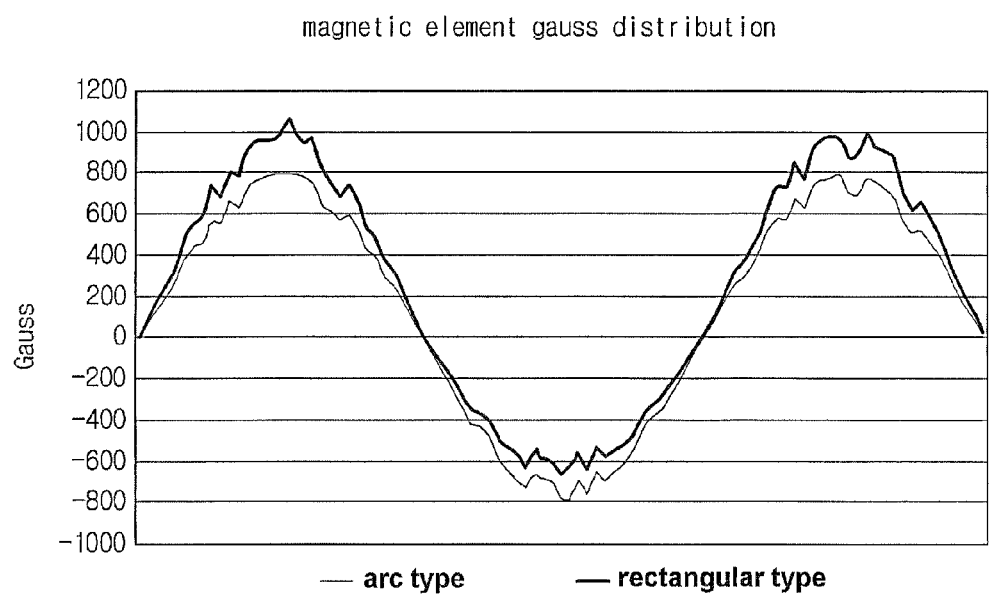
FIG. 6 is a schematic view of a torque index sensor according to prior art, and a graph illustrating a magnetization value of a magnetic device in a torque index sensor according to an exemplary embodiment of the present disclosure.

FIG. 6 is a schematic view of a torque index sensor according to prior art, and a graph illustrating a magnetization value of a magnetic device in a torque index sensor according to an exemplary embodiment of the present disclosure, where magnetization value of index magnet device is shown in Gauss units.

The overall shape of the graph is that an impulse signal is downwardly directed based on a center, where magnetization amount of the index magnet device (135) at an area arranged with an S pole is maximized to a negative direction on the center of the horizontal axis.

In a case a rectangular index magnet (140) according to the present disclosure is applied, it can be noted that peak values to negative and positive directions have a bit reduced compared with the prior art. However, in a magnet device that generates an impulse signal at every rotation of the output shaft, the magnetization amount provides no meaning in sensing an angle of steering axis if the magnetization amount exceeds a particular level.

That is, the index unit is meaningful in detecting an impulse signal, and size of the index unit has no effect on information process, such that a difference of approximately 200 Gausses is a value that can be disregarded. Therefore, a sufficiently detectable impulse signal can be generated even if the index magnet (140) according to the present disclosure is employed, which defines that there is no difference in angle detection performance over that of the prior art.

The torque index sensor according to the present disclosure thus configured has an advantageous effect in that an index magnet and each magnet forming the index magnet are shaped of a rectangle to simplify the structure and to enhance productivity.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:

1. A torque index sensor of a steering system connected to an input shaft and an output shaft, the torque index sensor comprising:
   a ring-shaped magnet housing;
   an index magnet housed in the magnet housing, connected to the output shaft to rotate with the output shaft and formed in a rectangle shape at a cross-sectional view; and
   a magnetic device generating an impulse signal in response to rotation of the index magnet, secured to an interior of the magnet housing to output a magnetization signal in response to rotation of the index magnet;
   wherein the index magnet is arranged at a recess portion further inside than an inner circumference of the magnet housing to generate a magnetic field to a direction facing the magnetic device;
   wherein the magnet housing is interposed between the output shaft and the input shaft, and takes shape of a ring, wherein the index magnet is coupled to a part of periphery of the magnet housing.

2. The torque index sensor of claim 1, wherein the index magnet is such that a plurality of magnets is arranged, each contacting the other magnet, wherein each of the plurality of magnets has a polarity opposite to that of an adjacent magnet, and takes the shape of a rectangle.

3. The torque index sensor of claim 1, wherein three index magnets are arranged lengthwise, each magnet contacting the other magnet, and a contact surface of each magnet is in parallel with that of the other magnet.

4. The torque index sensor of claim 1, wherein the magnetic device generates an impulse signal in response to rotation of the index magnet.

5. The torque index sensor of claim 1, wherein the magnetic device is a Hall element or a Hall IC.

* * * * *